United States Patent
Ji et al.

(10) Patent No.: US 8,397,159 B2
(45) Date of Patent: Mar. 12, 2013

(54) METHOD AND APPARATUS FOR SOLVING UI STYLE CONFLICTS IN WEB APPLICATION COMPOSITION

(75) Inventors: Peng Ji, Bejing (CN); Shun Xiang Yang, Beijing (CN); Guan Qun Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 12/685,025

(22) Filed: Jan. 11, 2010

(65) Prior Publication Data
US 2010/0180194 A1 Jul. 15, 2010

(30) Foreign Application Priority Data
Jan. 14, 2009 (CN) .................... 2009 1 0002661

(51) Int. Cl.
*G06F 17/27* (2006.01)
*G06F 17/30* (2006.01)
(52) U.S. Cl. ........ 715/234; 715/235; 715/236; 715/243; 715/248
(58) Field of Classification Search .......... 715/234–236, 715/243, 248
See application file for complete search history.

(56) References Cited

U.S. PATENT DOCUMENTS

| 6,418,446 | B1* | 7/2002 | Lection et al. ............. 1/1 |
| 7,403,951 | B2* | 7/2008 | Setlur et al. ............. 1/1 |
| 7,581,173 | B1* | 8/2009 | Ferguson et al. ............. 715/235 |
| 7,958,516 | B2* | 6/2011 | Buerge et al. ............. 719/318 |
| 8,055,685 | B2* | 11/2011 | Timmons ............. 707/803 |
| 2003/0005002 | A1* | 1/2003 | Chen et al. ............. 707/515 |
| 2007/0240041 | A1* | 10/2007 | Pearson ............. 715/522 |
| 2008/0052369 | A1* | 2/2008 | Weber et al. ............. 709/217 |
| 2008/0195483 | A1* | 8/2008 | Moore ............. 705/14 |
| 2009/0138509 | A1* | 5/2009 | Hind et al. ............. 707/104.1 |

FOREIGN PATENT DOCUMENTS
CN 1828597 A 9/2006

OTHER PUBLICATIONS

Charles P. Brown, Experience J2EE! Using WebSpere Application Server V6.1, publisher: IBM Redbooks, published: Jan. 31, 2007, pp. 15 and 16.*
Zhu Jun, et al., "An Architecture for Adaptively Replicating. . . Objects", Proceedsings, 5th International Symposium on Autonomous Decentralized Systems, 2001, see link below.
Mobile Web Best Practices 2.0, W3C Editor's Draft Mar. 27, 2008, http://www.w3.org/2005/MWI/BPWG/Group/Drafts/BestPractices-2.0/ED-mobile-bp2-20080327.

* cited by examiner

*Primary Examiner* — Stephen Hong
*Assistant Examiner* — Wilson Tsui
(74) *Attorney, Agent, or Firm* — Thomas Grzesik; Fleit Gibbons Gutman Bongini & Bianco PL

(57) ABSTRACT

A method and apparatus for solving UI style conflicts in web application composition. The method includes the steps of: detecting, in the runtime environment of a web browser, a page element referring to duplicate UI style definitions in a web composite page; determining the UI style definition referred to by the page element in an imported widget or a local page from which it originates; and relating the page element and the determined corresponding UI style definition in the web composite page, so as to solve the UI style conflict.

17 Claims, 8 Drawing Sheets

Figure 1:
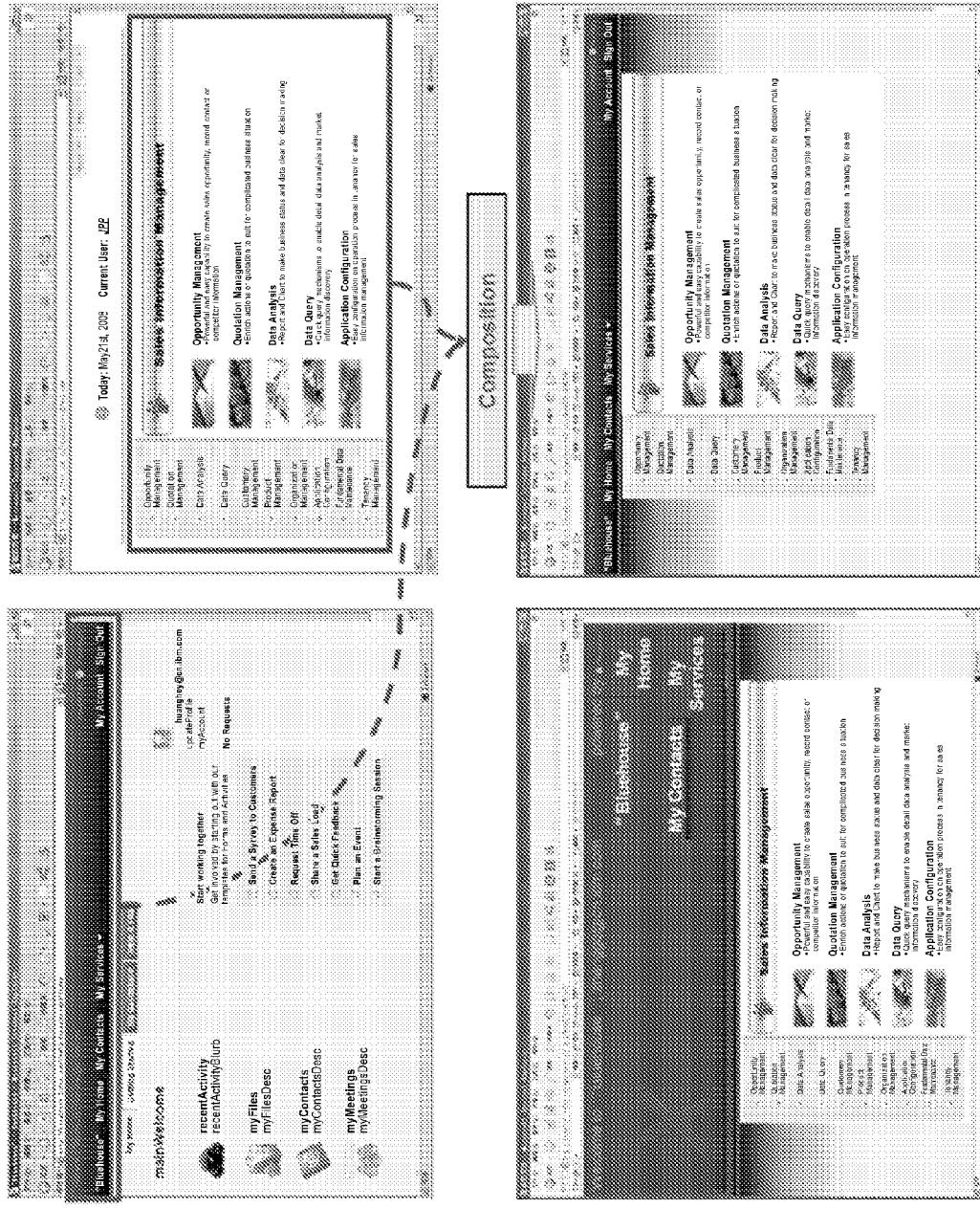

```
//LOOP listDynamicExternalLinkContents to re-get content from each item (from external site)
var tempSiteIdentity = "";
function fixHTMLCtrlHavingCSSConflicts () {
    if(listDynamicExternalLinkContents.length <= 0) {
        return;
    }

//alert("listDynamicExternalLinkContents.length: "+listDynamicExternalLinkContents.length) ;
    for(var i=0; i<listDynamicExternalLinkContents.length; I++) {
        var node2External = listDynamicExternalLinkContents[i] ;
        tempSiteIdentity = getSiteIdentity(node2External.src) ;
        triggerAjax(node2External.src, doFix) ;
    }
}

//AJAX framework
function triggerAjax(urlHandlerOnServer, funcOnClient) {
    if (window.XMLHttpRequest) {
        req = new XMLHttpRequest() ;
    } else if (window.ActiveXObject) {
        req = new ActiveXObject("Microsoft.SMLHTTP") ;
    } if(req) {
        req.open("GET",urlHandlerOnServer, true) ;
        req.setRequestHeader("Content-Type"' "application/x-www-form-urlencoded") ;
        req.onreadystatechange = funcOnClient;
        req.send(null) ;
    }
}
function getAjaxResponseComplete() {
    if (req.readyState == 4) {
        if  (req.status ==200) {
            return 1;
        }
        else{
            return 0;
        }
    }
    else{
        return 0;
    }
}
```

FIG. 5

METHOD AND APPARATUS FOR SOLVING UI STYLE CONFLICTS IN WEB APPLICATION COMPOSITION

CROSS REFERENCE TO RELATED APPLICATION

This application claims priority under 35 U.S.C. 119 under Chinese Patent Application 200910002661.7, filed Jan. 14, 2009, the entire contents of which are incorporated herein by reference.

BACKGROUND OF THE INVENTION

1. Field of the Invention

The present invention relates to web application composition technology and, more particularly, to a method and apparatus for solving UI style conflicts in web applications' composition.

2. Description of Related Art

Nowadays, web application composition technologies like Mash-up have been applied more and more widely in web application development. Large numbers of widgets from various web sites are composed to provide more convenient and richer use experiences to the terminal users. Gadget from Google, widgets from Yahoo! And PageFlakers, iWidget from IBM Lotus Mash-Up Center, etc., are the most typical and common products that are widely used currently.

Web application composition can be realized in the manner of static code insertion, for example, by copying and pasting on the code level, or using a certain Include directive in the code, for example, JSP instruction <@ include file=" . . . ">. However, the most common method to realize web application composition is dynamic importing, namely, composing external widgets into a local page by using commands like "<script src=" . . . "></script>".

For the widgets of which the composite page is composed and which come from various sources, a problem that must be faced and solved is how to maintain their original UI styles, e.g., CSS of a web application, without affecting each other.

CSS, namely, Cascading Style Sheet, is a mechanism for defining the presentation (for example, color, typeface, layout, etc.) of a markup language document like an HTML document. When CSS is used in a web application, there are three methods to define CSS in the web application codes: (1) external definition; for example, <link rel='stylesheet' href='http://localtest.lotus.com/bss/css/front.css' type='text/css'/>; (2) internal definition; for example, <head><style type="text/css">.styleItem1 {color: red; font-size: 10px;}</style></head>; and (3) inline definition; for example, <label style="color:red; font-size: 10px;">Hello</label>.

The web page analysis engine in a web browser applies various CSS definitions by using a cascade algorithm of CSS, which usually includes the following rules: (1) an inline definition has a higher priority compared with an external definition and an internal definition; (2) a CSS definition which is nearer to the target element has a higher priority; and (3) Order of Selector.

Due to the cascade algorithm of CSS, duplicate CSS definitions usually result in CSS conflicts, especially for a web application which adopts the Mash-up technology.

For example, when a widget is composed into a local page, the following situations may occur: (1) a CSS definition of the imported widget wrongly affects the CSS effects of the local page; (2) a CSS definition of the local page wrongly affects the CSS effects of the imported widget; and (3) CSS definitions of the imported widget and the local page wrongly affect each others' CSS effects, making both of them undesirable.

FIG. 1 shows an exemplary scenario of a real CSS conflict. The upper part of the figure shows two pages from two companies' web sites respectively. It is desired to compose the two widgets in the two pages together so as to form a composite page as shown in the lower-right part of the figure. However, since CSS definitions of the two widgets have conflicts, a composite page with an undesired UI style as shown in the lower-left part of the figure is formed.

Currently, there are the following two types of methods to solve the CSS conflict problem.

First, namespace appending in build-time, namely, when building the widgets of and the local page composing the composite page, their respective specific identities are added to the respective CSS definitions. In this way, each CSS definition will have a unique name in the composite page, whereby CSS conflict is avoided. This is a widely adopted method and is used by Google, PageFlakers, etc. The method is simple and straightforward, but has the two particular disadvantages. It complicates the code because it has extra requirements for programming, and it increases the difficulty for widgets to communicate with each other because each vendor/provider has its own standard for namespace appending.

A second method includes re-calculating CSS into the inline mode. The method tightly binds the calculated CSS definitions with HTML elements when packaging widgets. Though the method can also solve the problem of CSS conflicts, it has disadvantages. For example: it disobeys the cascading nature of CSS; setting all CSS definitions into "Inline mode" will increase the page size; and if there are changes in global CSS definition, re-calculation must be performed.

In addition, the existing methods are a build-time technology, rather than a run-time technology, and thus increase development costs.

SUMMARY OF THE INVENTION

With respect to the above problems in the prior art, the present invention provides a more convenient and effective method for solving CSS conflicts on a web browser in runtime.

According to one aspect of the present invention, a method for solving UI style conflicts in web application composition, includes: detecting a page element referring to duplicate UI style definitions in a web composite page in the runtime environment of the of web browser; determining the UI style definition referred to by the page element in the imported widget or the local page from which it originates; and relating the page element with the determined corresponding UI style definition in the web composite page, so as to solve the UI style conflict.

In another aspect of the present invention, apparatus is provided for solving UI style conflicts in web application composition. The apparatus includes: a detection module for detecting a page element referring to duplicate UI style definitions in a web composite page in the runtime environment of web browser; a determining module for determining the UI style definition referred to by the page element in the imported widget or the local page from which it originates; and a relating module for relating the page element with the determined corresponding UI style definition in the web composite page, so as to solve the UI style conflict.

The present invention not only solves the problem of UI style conflicts in web application composition effectively, but also it is not code-intrusive, overcomes the limitation of different standards by different vendors/providers, abides by the cascading nature of the UI style standard like CSS, will not increase the page size, and facilitate changes of UI style definitions.

BRIEF DESCRIPTION OF THE
ACCOMPANYING DRAWINGS

Figure 2:
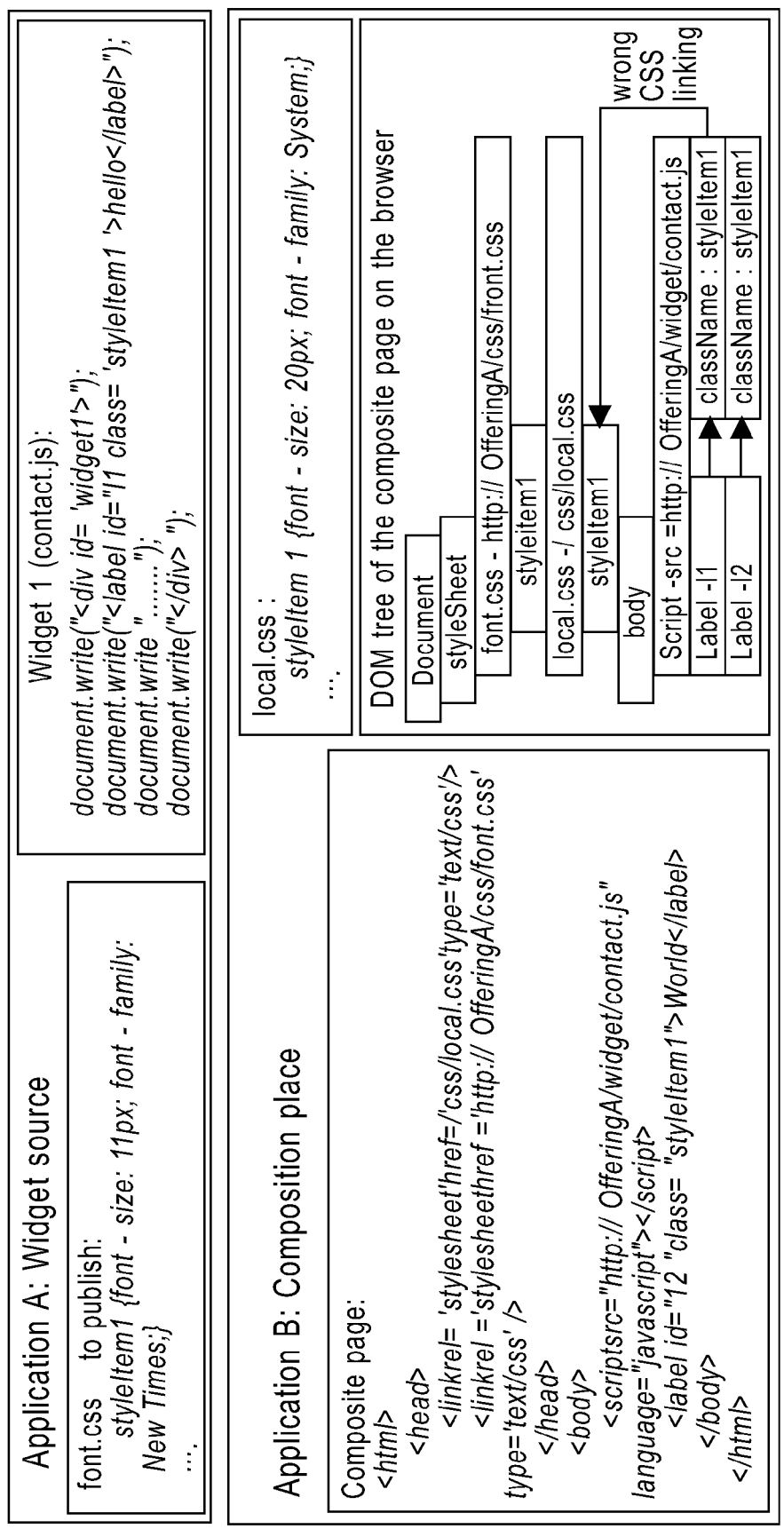
Figure 3:
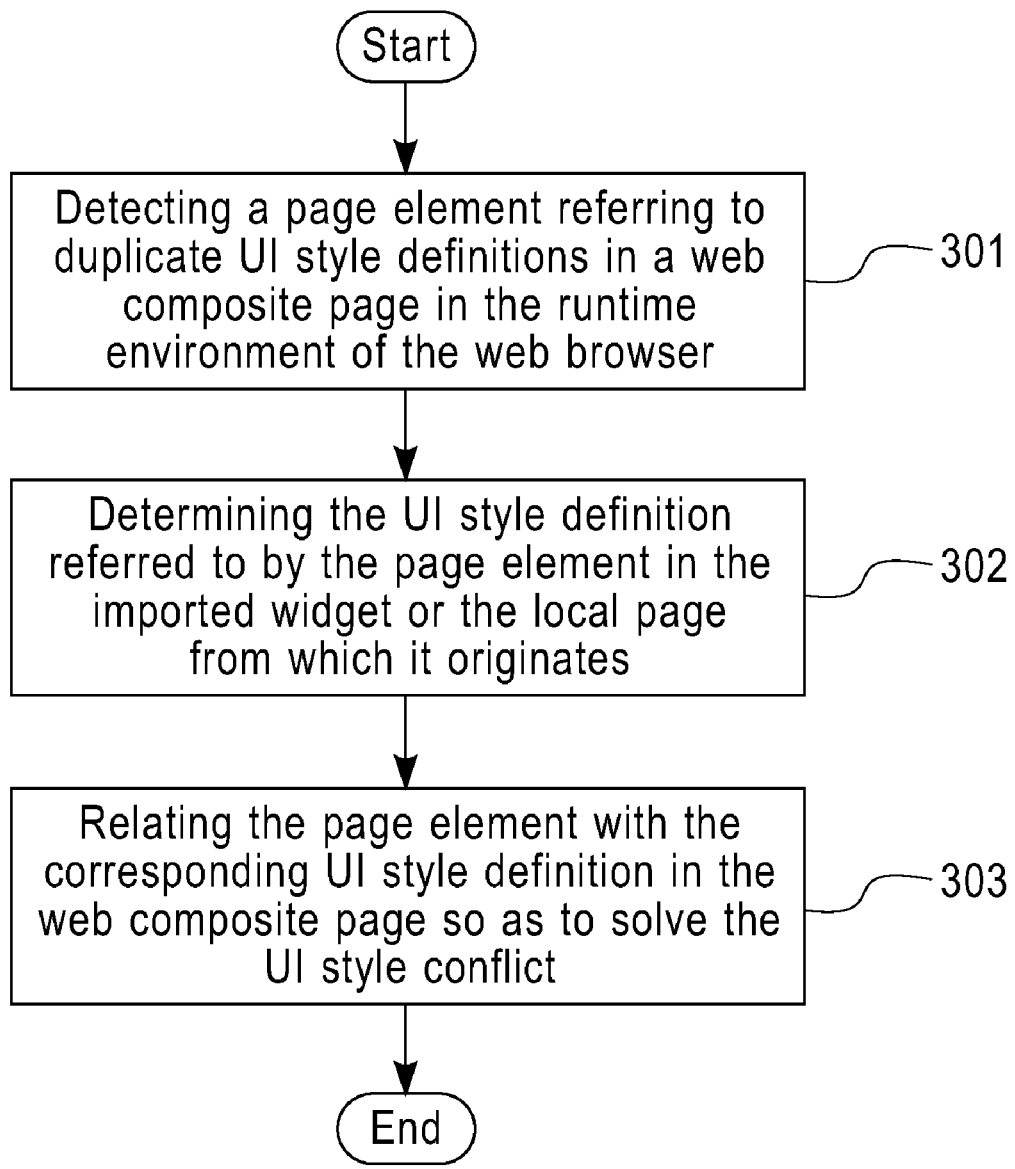
Figure 4A:
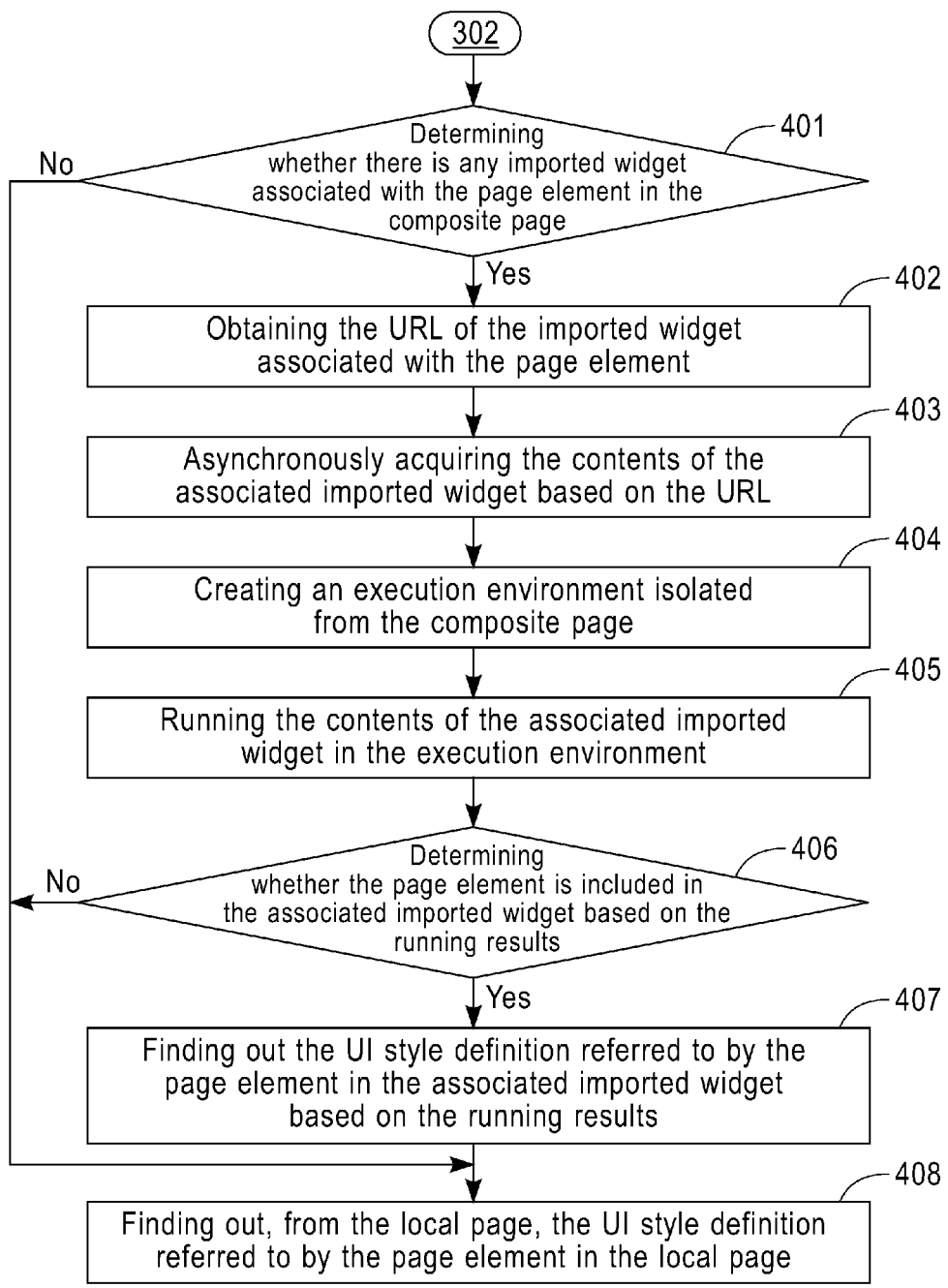
Figure 4B:
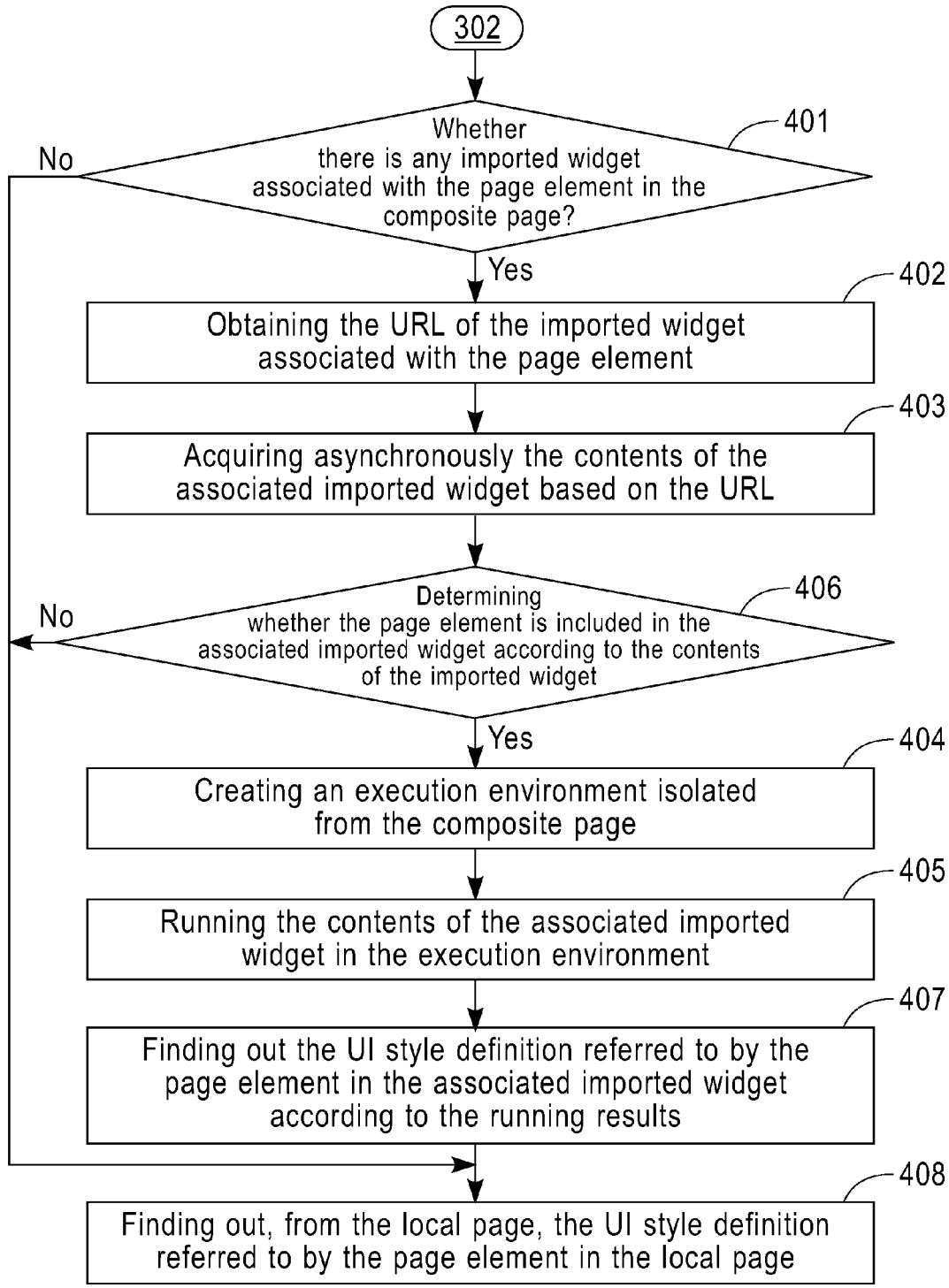
Figure 6:
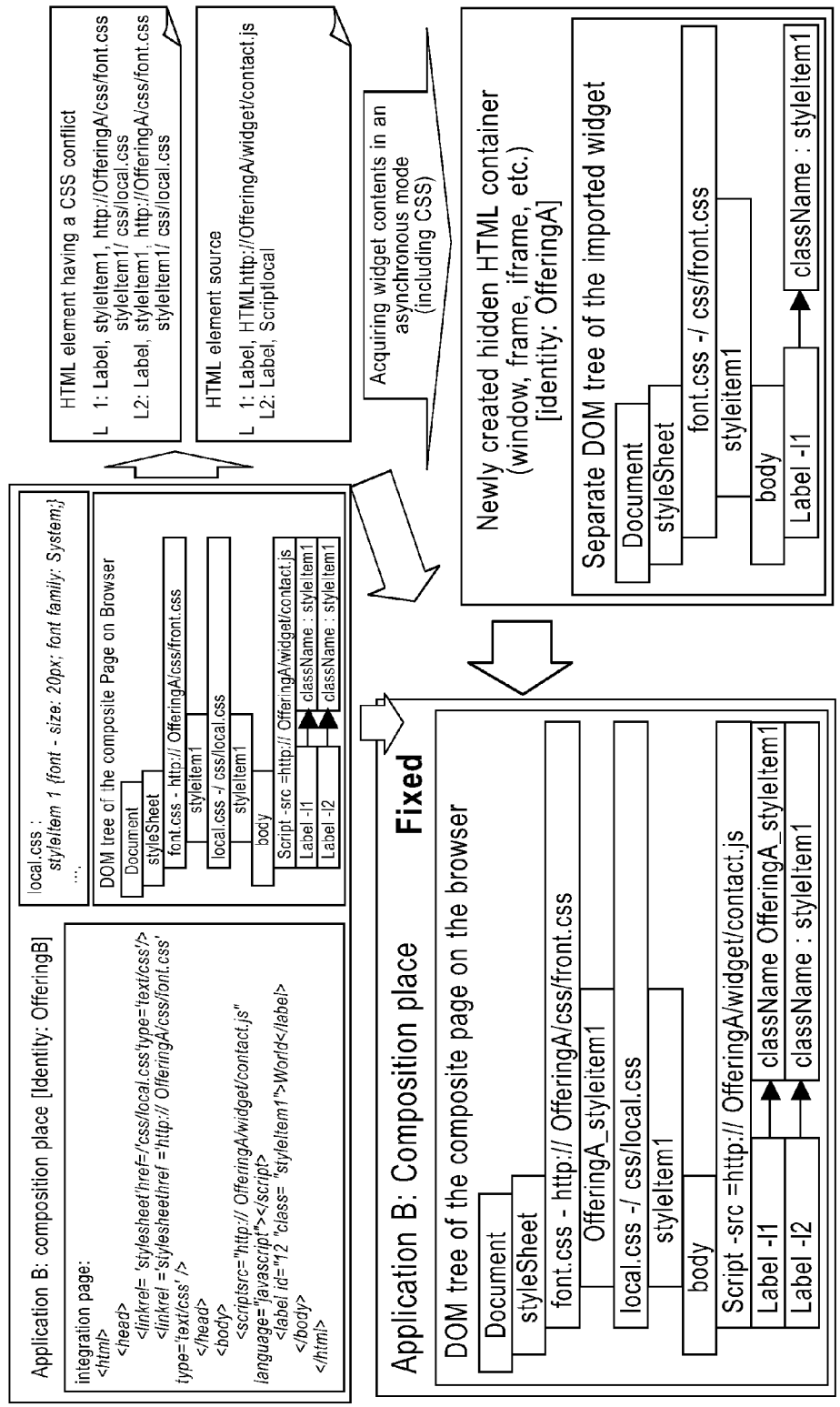
Figure 7:
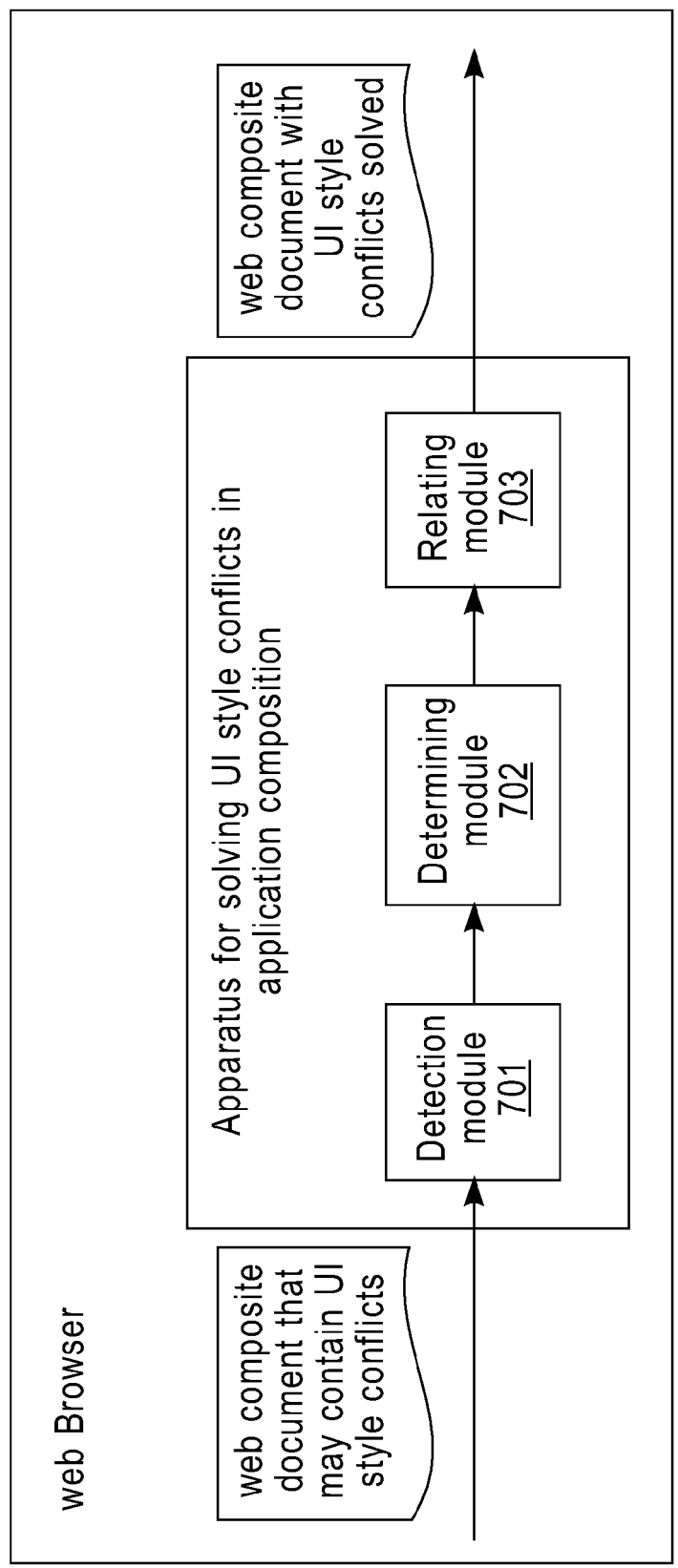

The present invention and its preferred modes, other objects, features and advantages will be better understood by referring to the detailed description of the exemplary embodiments when read in conjunction with the attached drawings, in which:

FIG. 1 shows an exemplary scenario of a real CSS conflict;

FIG. 2 schematically illustrates an example of the cause of the generation of the UI style conflict problem in web application composition;

FIG. 3 shows a method for solving UI style conflicts in web application composition according to an embodiment of the present invention;

FIG. 4A further shows sub-steps included in the determining step of the method for solving UI style conflicts in web application composition according to an embodiment of the present invention;

FIG. 4B further shows sub-steps included in the determining step of the method for solving UI style conflicts in web application composition according to another embodiment of the present invention;

FIG. 5 shows exemplary implementation code of the main steps in the method for solving UI style conflicts in web application composition according to an embodiment of the present invention;

FIG. 6 schematically shows an example of the principle of the method according to an embodiment of the present invention; and FIG. 7 shows an apparatus for solving UI style conflicts in web application composition according to an embodiment of the present invention.

DETAILED DESCRIPTION OF PREFERRED
EMBODIMENTS

The present invention not only solves the problem of UI style conflicts in web application composition effectively, but also the solution is in runtime, rather than in build-time, and thus it is not code-intrusive and will not bring extra burden to programming, and it also overcomes the limitation of different standards by different vendors/providers. In addition, the present invention abides by the cascading nature of the UI style standard like CSS. It will not increase the page size and it will facilitate changes of the UI style definitions.

FIG. 2 schematically shows an exemplary cause of the generation of the UI style conflict problem in web application composition by referring to FIG. 2. A widget 1 belongs to an application A, and the URL of its source file is http://Offering A/widget/contact.js. The widget contains a label element with an id of "I1", and the label element refers to a CSS definition named "systemItem1". The widget imports the CSS definitions in a CSS filein the manner of external definition (not shown), and the URL of the CSS file is 'http://OfferingA/css/font.css'. Since the CSS file contains the CSS definition named "SystemItem1": styleItem1{font-size: 11px; font-family:New Times;}, the label element with the id of "I1" in the widget should adopt the style in the CSS definition, that is, with a font-size of 11 px, and a font-family of New Times.

In addition, the local page contains a label element with an id of "I2", which refers to the CSS definition named "systemItem1". The local page imports the CSS definitions of a local CSS file in the manner of external definition, and the URL of the local CSS file is /css/local.css. Since the local CSS file contains the CSS definition named "systemItem1": styleItem1 {font-size: 20px; font-family: System;}, the label element with the id of "I2" in the local page should use the style of styleItem1 defined in the local CSS file, namely, with a front-size of 20px and a front-family of System.

Since, in the source file of the local page, the contents of the above widget and the CSS file thereof are also imported by a <script> tag dynamically, two CSS files will be introduced into the resultant web composite page, and the two CSS files will have two CSS definitions with the same name styleItem1, but with different contents. In this way, abiding the cascade algorithm, the label elements with ids of "I1" and "I2" in the composite file will be unable to refer to the correct CSS definitions, thus generating CSS conflicts.

Embodiments of the present invention will now be described with reference to the accompanying drawings. In the following description, numerous details are described to enable the present invention to be fully understood. However, it is obvious to those skilled in the art that the implementation of the present invention may not include some of these details. In addition, it should be appreciated that the present invention is not limited to the described specific embodiments. On the contrary, it is contemplated to implement the present invention by using any combination of the following features and elements, no matter whether they involve different embodiments or not. Therefore, the following aspects, features, embodiments and advantages are only illustrative, rather than being elements or limitation of the appended claims, unless explicitly stated otherwise in the claims.

FIG. 3 shows a method for solving UI style conflicts in web application composition according to an embodiment of the present invention. The web application composition is, for example, Mash-up. The UI style conflicts are usually caused by duplicate UI style definitions. And the UI style conflicts caused by duplicate UI style definitions refer to that since the web composite page includes web contents from a local page and one or more imported widgets, UI style definitions with identical names but different contents may be defined in the local page and imported widgets, thus, the DOM structure of the web composite page may include UI style definitions with identical names but different contents, which makes a page element in the web composite page refer to a wrong UI style definition.

In an embodiment of the present invention, the UI style definition is CSS style definition. Of course, this is not limitation to the present invention, and the method of the present invention can also be applied to scenarios in which other UI style definitions are used.

As shown, the method includes the following steps.

In step 301, in the runtime environment of a web browser, a page element referring to duplicate UI style definitions in the web composite page is detected. For example, by analyzing the DOM structure of the web composite page to detect whether each HTML element refers to duplicate CSS definitions, all the HTML elements referring to duplicate CSS definitions can be found out.

In step 302, the UI style definition referred to by the page element in the imported widget or the local page from which it originates is determined. After a web composite page is formed from the local page and one or more imported widgets, the correlations between the page element in the original local page or the imported widgets and the UI style definition to which it refers is no longer maintained in the DOM structure of the web composite page, and even whether the page element originates from the local page or a certain imported widget cannot be determined from the DOM structure of the web composite page. Therefore, the UI style definition referred by the page element in the imported widget or local page from which it originates cannot be determined from the DOM structure of the web composite page. To this end, in an embodiment of the present invention, a method described as follows is used to determine the UI style definition referred to by a page element in the imported widget or the local page from which it originates.

In step 303, the page element is associated with the determined corresponding UI style definition in the web composite page, and thereby solving the UI style conflict. That is to say, after determining the UI style definition referred to by the page element in the imported widget or the local page from which it originates in step 401, the page element is made to refer to the determined corresponding UI style definition in the web composite page.

Various methods can be used to make the page element to associate with the corresponding UI style definition in the web composite page. Only as an example, in an embodiment of the present invention, by modifying the name of the corresponding UI style definition into a unique name and making the page element refer to the unique name, the page element is associated with the UI style definition. For example, by means of space name appending, the identity of the application to which the local page or the imported widget belongs or other unique identifiers can be added to the name of the corresponding UI style definition, so as to make the name of the UI style definition unique in the DOM structure of the web composite page, or by modifying the name of the UI style into a unique name in the DOM structure of the web composite page by other means and by modifying the reference to the UI style definition by the corresponding page element in the DOM structure of the web composite page to make it refer to the unique name.

In another embodiment of the present invention, by re-calculating the corresponding UI style definition into the inline UI style definition of the page element, the page element and the UI style definition are associated. That is to say, after determining the UI style definition referred to by the page element in the imported widget or the local page from which it originates in step 302, the UI style is re-calculated into the inline UI style definition of the page element in the DOM structure of the web composite page.

FIG. 4A further shows sub-steps included in the above determining step 302 in an embodiment of the present invention.

As shown, in step 401, it is determined whether there is an imported widget in the web composite page, which is associated with the page element referring to duplicate UI style definitions as detected in above step 301. For example, by analyzing the DOM structure of the web composite page, if it is found there exists a Script element before the page element, then it can be determined that the Script element denotes an imported widget. Of course, after a Script element is found before the page element, the URL of the Script element can be further determined and it can be judged whether the URL and the local page have the same application identity. When the URL and the local page have the same application identity, this denotes that the Script element is a local script; and when the URL and the local page do not have the same application identity, it is determined the Script represents an imported widget.

In step 402, in response to determining there is an imported widget associated with the page element in the composite page in step 401, the URL of the imported widget associated with the page element is obtained.

In step 403, the contents of the associated imported widget are obtained asynchronously according to the obtained URL. In an embodiment of the present invention, this is performed by AJAX. Of course, this is not a limitation to the present invention. In other embodiments of the present invention, the contents of the associated imported widget can also be obtained in other asynchronous manners.

In step 404, a runtime environment isolated from the web composite page is created. In an embodiment of the present invention, the runtime environment isolated from the web composite page refers to a hidden web page container element with a DOM structure separate from the web composite page, e.g., a hidden window, iframe, frame, etc. Since the runtime environment has a DOM structure separate from the web composite page, the contents of the imported widget obtained in the step 403 can be run in the runtime environment, thus forming a DOM structure including the various page elements in the imported widget and their UI style definitions, and the influence with the web composite page is avoided.

In step 405, the contents of the associated imported widget are run in the runtime environment. In an embodiment of the present invention, this is accomplished in the following manner: creating a "<script>" tag in the isolated runtime environment to make the tag contain the contents of the associated imported widget obtained in step 403, and making the tag to run in the isolated runtime environment. Since the contents of the imported widget have been obtained to local in step 403, the Same Origin Policy of the web browser is bypassed, which enables the code in the web composite page to access the contents of the DOM structure of the isolated runtime environment. In this way, the method of the present application can be realized by the code, like JavaScript, included in each web composite page.

In step 406, according to the running results in step 404, it is determined whether the page element referring to duplicate UI style definitions as detected in step 301 is included in the associated imported widget. In an embodiment of the present invention, this is accomplished by analyzing the separate DOM structure formed in step 404 to determine whether the page element is included in the DOM structure.

In step 407, in response to determining that the page element is included in the associated imported widget in step 406, the UI style definition referred to by the page element in the associated imported widget is found based on the running results. In an embodiment of the present invention, this is accomplished by analyzing the separate DOM structure formed in step 404.

In step 408, in response to determining that there is no imported widget associated with the page element in the web composite page in step 401, or in response to determining that the page element is not included in the associated imported widget in step 406, the UI style definition referred to by the page element in the local page is found out from the local page.

FIG. 4B further shows the steps included in the above determining step 301 in another embodiment of the present invention. In FIG. 4B, the same steps as those in FIG. 4A use the same reference numerals.

As shown, in step 401, it is determined whether there exists any imported widget associated with the page element in the web composite page.

In step 402, in response to determining that there exists an imported widget associated with the page element in the web composite page, the URL of the imported widget associated with the page element is obtained.

In step 403, the contents of the associated imported widget are obtained asynchronously based on the URL.

In step 406', it is determined whether the page element is included in the associated imported widget based on the obtained contents of the associated imported widget.

In response to determining that the page element is included in the associated imported widget, the following steps are performed: in step 404, a runtime environment isolated from the web composite page is created; in step 405, the contents of the associated imported widget are run in the runtime environment; in step 407, the UI style definition referred to by the page element in the associated imported widget is found based on the running results.

In step 408, in response to determining that there is no imported widget associated with the page element in the web composite page in step 401, or in responses to determining that the page element is not included in the associated imported widget in step 406', the UI style definition referred to by the page element in the local page is found in the local page.

In an embodiment of the present invention, in the runtime environment of the web browser, each page element referring to duplicate UI style definitions in the web composite page is detected, and the above process is performed for the each page element.

In an embodiment of the present invention, the method can be implemented by a script, e.g., a JavaScript script, added to each web composite page. In this way, the method can start to be executed each time the web composite page is loaded. The displaying of the web composite page can be performed after the execution of the method has been completed and thus possible UI style conflicts have been solved. In this way, first displaying the wrong UI style and then displaying the correct UI style can be avoided, hence achieving better user experience. In another embodiment of the present invention, the method can be implemented by a standalone browser plug-in, and thus the method can be triggered to be executed by the user clicking a bookmark in the web browser window, for example.

FIG. 5 shows exemplary implementation code of the main steps of the method according to an embodiment of the present invention. As shown, the URL of each imported widget associated with the one or more page elements referring to duplicated CSS definitions are stored in the list variable listDynamicExternalLinkContents; a function triggerAjax is called for the URL of each imported widget in the variable, and the function uses AJAX to obtain the contents of the imported widget; the contents are placed in the sReturn variable in the DoFix function in text format, and then by using a window.open statement, an isolated DOM structure environment is created, namely, a sub-window which does not have an URL and is hidden; then a document, newDocument, is created for the window, and a Script element, newScript, is created for the document, and the text contents of the imported widget in the sReturn variable assigned to the text attribute of the element newScript; and the imported widget is run by the statement newDocument.body.appendChild(newScript). Thus, a DOM structure including the various page elements in the imported widget and the CSS definitions to which they refer is created, from which the CSS definitions of the page elements in the imported widget from which they originate can be obtained.

FIG. 6 schematically shows an example of the principle of the method according to the embodiment of the present invention. As shown, the DOM structure of the web composite page includes the CSS definitions both having the name of styleItem1 and respectively from the CSS definition files of the local page and the imported widget, thus making the label elements L1 and L2 respectively from the imported widget and the local page in the web composite pages refer to the duplicate CSS definitions.

By executing the method according to an embodiment of the present invention, the contents of the imported widget are obtained again from the external source of the imported widget in an asynchronous manner, and the obtained contents of the imported widget are run in the newly created hidden HTML container, thus generating a DOM structure of the imported widget isolated from the DOM structure of the web composite page, in which the correlation between the label element L1 and the correct styleItem1 can be determined. Then, in the DOM structure of the web composite page, by adding the application identity to the name of the corresponding styleItem1 to make it an unique name in the DOM structure and modifying the reference by the label element L1 to the CSS definition to make it refer to the unique name, the problem of CSS conflict in the web composite page is solved.

Above is described the method for solving UI style conflicts in web application composition according to an embodiments of the present invention. It should be pointed out that the above description is only exemplary, not limitation to the present invention. In other embodiments of the present application, the method can have more, less or different steps, and the orders between the steps can be different from those described or can be executed in parallel. And some of the described steps may be merged into bigger ones, or divided into smaller ones.

For example, it is also contemplated that after detecting conflicting CSS definitions in the web composite page, the contents of the each of the existing imported widgets in the web composite page are regained directly, and the contents of each imported widget are run in a created isolated runtime environment, so that the CSS definitions referred to by the page elements of each imported widget can be determined, and the page elements from each imported widget are associated with the corresponding CSS definitions in the web composite page.

As another example, although above are described the steps in the method of the present application by using the DOM structure, JavaScript and AJAX and the like as an example, these are not limitation to the present invention. On the contrary, the method of the present invention can also be used in scenarios where other document structures, script languages and asynchronous communication mechanisms are adopted. As yet another example, in some embodiments of the present invention, either or both of the above steps 401 and 408 may not be included, and so on. All these variations are within the sprit and scope of the present invention.

Now referring to FIG. 7, an apparatus for solving UI style conflicts in web application composition according to an embodiment of the present invention is shown. The apparatus can be used to execute the above described method for solving UI style conflicts in web application composition according to an embodiment of the present invention. For simplicity, some contents redundant with the above description are omitted in the following description.

As shown, the apparatus includes: a detection module 701 for detecting the page element referring to duplicate UI style definition in a web composite page in the runtime environment of the web browser; a determining module 702 for determining the UI style definition referred to by the page element in the imported widget or the local page from which it originates; a relating module 703 for relating the page element with the corresponding UI style definition in the page element, so as to solve the UI style conflict.

In an embodiment of the present invention, the determining module 702 includes: means for obtaining the URL of the imported widget associated with the page element; means for asynchronously acquiring the contents of the associated imported widget based on the URL; means for creating a runtime environment isolated from the web composite page; means for running the contents of the associated imported widget in the runtime environment; means for determining whether the page element is included in the associated imported widget according to the running results; and means for finding out the UI style definition referred to by the page element in the associated imported widget according to the running results, in response to determining that the page element is included in the associated imported widget.

In another embodiment of the present invention, the determining module 702 includes: means for obtaining the URL of the imported widget associated with the page element; means for asynchronously acquiring the contents of the associated imported widget based on the URL; means for determining whether the page element is included in the associated imported widget according to the acquired contents of the associated imported widget; means for creating a runtime environment isolated from the web composite page in response to determining that the page element is included in the associated imported widget; and means for running the contents of the associated imported widget in the runtime environment; means for finding out the UI style definition referred to by the page element in the associated imported widget according to the running results.

In an embodiment of the present invention, the determining module 702 further includes: means for finding out, from the local page, the UI style definition referred to by the page element in the local page, in response to determining that there is no imported widget associated with the page element in the web composite page, or in response to determining that the page element is not included in the associated imported widget.

In an embodiment of the present invention, the runtime environment isolated from the web composite page is a hidden web page container element having a DOM structure separate from the web composite page, and the running results are a DOM structure loaded with the contents of the associated imported widget.

In an embodiment of the present invention, the means for asynchronously acquiring the contents of the associated imported widget based on the URL is for asynchronously acquiring the contents of the associated imported widget based on the URL through AJAX.

In an embodiment of the present invention, the relating module 703 includes any one of the following means: means for modifying the name of the corresponding UI style definition into a unique name and making the page element refer to the unique name; and means for re-calculating the corresponding UI style definition into an inline UI style definition of the page element.

In an embodiment of the present invention, the UI style definition is a CSS style definition.

In an embodiment of the present invention, the apparatus for solving UI style conflicts in web application composition is implemented by a script in the web composite page or a web browser plug-in.

Above is described the apparatus for solving UI style conflicts in web application composition according to an embodiment of the present invention. It should be pointed out that the above description is only exemplary, rather than limitation to the present invention. In other embodiments of the present invention, the apparatus can have more, less or different modules, and the connection, containment and functional relationships among the modules may be different from that is described, and some of the described modules may be merged into bigger ones, or divided into smaller ones. All these variations are within the sprit and scope of the present invention.

The present invention can be realized by hardware, software, or a combination thereof. The present invention can be implemented in a single computer system in a centralized manner, or in a distributed manner in which different components are distributed in several inter-connected computer systems. Any computer system or other apparatus suitable for executing the method described herein are applicable. A typical combination of hardware and software may be a general-purpose computer system with a computer program, which when being loaded and executed, controls the computer system to execute the method of the present invention and constitutes the apparatus of the present invention.

The present invention can also be embodied in a computer program product, which includes all the features that enable to realize the method described herein, and when being loaded into a computer system, can execute the method.

Although the present invention has been illustrated and described with reference to the preferred embodiments, those skilled in the art should appreciate that various changes in form and details can be made thereto without departing from the spirit and scope of the present invention.

What is claimed is:

1. A method for solving UI style conflicts in web application composition, comprising:
   detecting a page element referring to a duplicate UI style definition in a web composite page, in a runtime environment of a web browser;
   determining that the web composite page comprises an imported widget;
   obtaining, based on the determining, a uniform resource locator (URL) of the imported widget;
   acquiring, based on the obtaining, a content set of the imported widget based on the URL;
   creating, based on the acquiring, a runtime environment isolated from the web composite page, wherein the runtime environment comprises a DOM structure of the imported widget comprising a plurality of page elements associated with the imported widget and UI style definitions associated with each of the plurality of page elements;
   determining, based on the DOM structure, that the page element referring to the duplicate UI style definition is included within one of imported widget and a local page from which the imported widget originates;
   identifying, based on determining that the page element is included within one of the imported widget and the local page, the UI style definition originally referred to by the page element in one of the DOM structure and the local page, respectively; and
   updating the identified UI style definition in the web composite page, so as to solve the UI style conflict.

2. The method of claim 1, wherein creating the runtime environment comprises:
   running the content set of the imported widget in the runtime environment, and wherein the UI style definition is identified based on running the content set.

3. The method of claim 1, wherein the identifying comprises:
identifying the UI style definition referred to by the page element in the local page in response to the imported widget failing to comprise the page element in the web composite page.

4. The method of claim 1, wherein the runtime environment isolated from the web composite page is a hidden web page container element.

5. The method of claim 1, wherein the content set is acquired asynchronously performed through AJAX.

6. The method of claim 1, wherein the updating comprises one of:
modifying a name of the identified UI style definition into a unique name and making the page element refer to the unique name; and
re-calculating the identified UI style definition into an inline UI style definition of the page element.

7. The method of claim 1, wherein the duplicate UI style definition and the identified UI style definition are CSS style definitions.

8. The method of claim 1, wherein the method is implemented by a script in one of the web composite page and a web browser plug-in.

9. An information processing system for solving UI style conflicts in web applications composition, the information processing system comprising:
a processor;
a memory communicatively coupled to the processor; and
a web application composition environment communicatively coupled to the processor and the memory, wherein the web application composition environment is configured to perform a method comprising:
detecting a page element referring to a duplicate UI style definition in a web composite page, in a runtime environment of a web browser;
determining that the web composite page comprises an imported widget;
obtaining, based on the determining, a uniform resource locator (URL) of the imported widget;
acquiring, based on the obtaining, a content set of the imported widget based on the URL;
creating, based on the acquiring, a runtime environment isolated from the web composite page, wherein the runtime environment comprises a DOM structure of the imported widget comprising a plurality of page elements associated with the imported widget and UI style definitions associated with each of the plurality of page elements;
determining, based on the DOM structure, that the page element referring to the duplicate UI style definition is included within one of imported widget and a local page from which the imported widget originates;
identifying, based on determining that the page element is included within one of the imported widget and the local page, the UI style definition originally referred to by the page element in one of the DOM structure and the local page, respectively; and
updating the identified UI style definition in the web composite page, so as to solve the UI style conflict.

10. The information processing system of claim 9, wherein creating the runtime environment comprises:
running the content set of the imported widget in the runtime environment, and
wherein the UI style definition is identified based on running the content set.

11. The information processing system of claim 9, wherein the identifying comprises:
identifying the UI style definition referred to by the page element in the local page in response to the imported widget failing to comprise the page element in the web composite page.

12. The information processing system of claim 9, wherein the runtime environment isolated from the web composite page is a hidden web page container.

13. The information processing system of claim 9, wherein the content set is acquired asynchronously through AJAX.

14. The information processing system of claim 9, wherein the updating comprises one of:
Modifying a name of the identified UI style definition into a unique name and making the page element refer to the unique name; and
Means for re-calculating the identified UI style definition into an inline UI style definition of the page element.

15. The information processing system of claim 9, wherein the duplicate UI style definition and the identified UI style definition are CSS style definitions.

16. The information processing system of claim 9, wherein the apparatus is implemented by a script in one of the web composite page and a web browser plug-in.

17. A computer program product comprising a non-transitory computer readable storage medium having computer readable program code embodied therewith, the computer readable program code configured to perform a method comprising:
detecting a page element referring to a duplicate UI style definition in a web composite page, in a runtime environment of a web browser;
determining that the web composite page comprises an imported widget;
obtaining, based on the determining, a uniform resource locator (URL) of the imported widget;
acquiring, based on the obtaining, a content set of the imported widget based on the URL;
creating, based on the acquiring, a runtime environment isolated from the web composite page, wherein the runtime environment comprises a DOM structure of the imported widget comprising a plurality of page elements associated with the imported widget and UI style definitions associated with each of the plurality of page elements;
determining, based on the DOM structure, that the page element referring to the duplicate UI style definition is included within one of imported widget and a local page from which the imported widget originates;
identifying, based on determining that the page element is included within one of the imported widget and the local page, the UI style definition originally referred to by the page element in one of the DOM structure and the local page, respectively; and
updating the identified UI style definition in the web composite page, so as to solve the UI style conflict.

* * * * *